United States Patent
Gan et al.

(10) Patent No.: US 8,682,968 B2
(45) Date of Patent: Mar. 25, 2014

(54) METHOD, SYSTEM, AND NODE FOR NODE INTERCONNECTION ON CONTENT DELIVERY NETWORK

(71) Applicant: Huawei Technologies Co., Ltd., Guangdong (CN)

(72) Inventors: Mo Gan, Shenzhen (CN); Jin Xu, Shenzhen (CN); Yu Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/654,116

(22) Filed: Oct. 17, 2012

(65) Prior Publication Data

US 2013/0191443 A1 Jul. 25, 2013

(30) Foreign Application Priority Data

Jan. 20, 2012 (CN) .......................... 2012 1 0018878

(51) Int. Cl.
*G06F 15/16* (2006.01)
*G06F 15/173* (2006.01)

(52) U.S. Cl.
USPC ........... 709/203; 709/213; 709/214; 709/223; 709/231; 709/217; 707/711; 707/821; 707/822

(58) Field of Classification Search
USPC ......... 709/203, 206, 213, 214, 217, 223, 231, 709/225; 707/711, 821–822
See application file for complete search history.

(56) References Cited

U.S. PATENT DOCUMENTS

| | | | | |
|---|---|---|---|---|
| 7,260,639 | B2 * | 8/2007 | Afergan et al. | 709/229 |
| 7,756,913 | B1 * | 7/2010 | Day | 707/821 |
| 8,200,958 | B2 * | 6/2012 | Coppola et al. | 713/153 |
| 8,230,098 | B2 * | 7/2012 | Chen et al. | 709/231 |
| 2005/0216569 | A1 | 9/2005 | Coppola et al. | |
| 2008/0263130 | A1 * | 10/2008 | Michalowitz et al. | 709/202 |

(Continued)

FOREIGN PATENT DOCUMENTS

| | | |
|---|---|---|
| CN | 1659843 A | 8/2005 |
| CN | 101662491 A | 3/2010 |

(Continued)

OTHER PUBLICATIONS

Extended European Search Report in corresponding European Patent Application No. 12189688.0 (May 7, 2013).

(Continued)

*Primary Examiner* — Alina N Boutah
(74) *Attorney, Agent, or Firm* — Leydig, Voit & Mayer, Ltd.

(57) ABSTRACT

The present invention discloses a method, a system, and a node for node interconnection on a content delivery network. This content delivery network includes a first-level CDN node that is formed of a first CDN media server and a first CDN content storage and is configured to provide content for a user, and a second-level CDN node that is formed of a second CDN media server and a second CDN content storage and interconnects with the first-level CDN node, where the first CDN media server accesses the content in the second CDN content storage by using an IP-layer storage access protocol. The networking is simplified and the content access efficiency and the resource utilization are improved by using the technical solutions of node interconnection on the content delivery network provided in the present invention.

12 Claims, 13 Drawing Sheets

(56) References Cited

U.S. PATENT DOCUMENTS

| | | | |
|---|---|---|---|
| 2009/0113253 A1* | 4/2009 | Wang et al. | 714/48 |
| 2009/0254661 A1* | 10/2009 | Fullagar et al. | 709/226 |
| 2010/0057914 A1 | 3/2010 | Wang | |
| 2011/0082724 A1* | 4/2011 | Le Chevalier et al. | 705/14.4 |
| 2011/0099262 A1* | 4/2011 | Wang | 709/223 |
| 2011/0125727 A1* | 5/2011 | Zou et al. | 707/711 |
| 2011/0225028 A1* | 9/2011 | Rutman | 705/14.4 |
| 2011/0246608 A1* | 10/2011 | Wu et al. | 709/217 |
| 2011/0296053 A1* | 12/2011 | Medved et al. | 709/241 |
| 2012/0215629 A1* | 8/2012 | Girouard et al. | 705/14.49 |
| 2012/0226649 A1* | 9/2012 | Kovacs et al. | 706/47 |
| 2012/0265895 A1* | 10/2012 | Chen et al. | 709/231 |
| 2012/0297192 A1* | 11/2012 | Coppola et al. | 713/168 |
| 2012/0297431 A1 | 11/2012 | Wang | |
| 2012/0317232 A1* | 12/2012 | Bao | 709/217 |
| 2012/0317291 A1* | 12/2012 | Wolfe | 709/226 |
| 2013/0018978 A1* | 1/2013 | Crowe et al. | 709/214 |

FOREIGN PATENT DOCUMENTS

| | | |
|---|---|---|
| CN | 101710965 A | 5/2010 |
| CN | 102088389 A | 6/2011 |
| WO | WO 2011/103293 A2 | 8/2011 |

OTHER PUBLICATIONS

Pathan et al., "A Taxonomy and Survey of Content Delivery Networks," Feb. 12, 2006, University of Melbourne, Parkville, Australia.

Pathan et al., "Resource Discovery and Request-Redirection for Dynamic Load Sharing in Multi-Provider Peering Content Delivery Networks," Journal of Network and Computer Applications, Sep. 1, 2009, vol. 32, No. 5, Elsevier, Philadelphia, PA.

* cited by examiner

METHOD, SYSTEM, AND NODE FOR NODE INTERCONNECTION ON CONTENT DELIVERY NETWORK

CROSS-REFERENCE TO RELATED APPLICATIONS

This application claims priority to Chinese Patent Application No. 201210018878.9, filed on Jan. 20, 2012, which is hereby incorporated by reference in its entirety.

FIELD OF THE INVENTION

The present invention relates to communications technologies, and in particular to a method, a system, and a node for node interconnection on a content delivery network.

BACKGROUND OF THE INVENTION

A content delivery network (Content Delivery Network, CDN) releases content on a network "edge" nearest to a user by adding a new network architecture into an existing IP network, so that the user may obtain needed content nearby. The CDN is formed of a plurality of CDN nodes forming a tree structure or a mesh structure. The lower the position of a node is in the network structure, the nearer the node is to the user. Generally, the most popular content, that is, the content accessed with the highest frequency, is stored on the node that is near the user to enable the user to obtain a service nearby and to reduce loss of upper-level network bandwidth. A CDN node is generally formed of a plurality of media server clusters, and provides several users with streaming media services simultaneously.

In addition, the CDN technology is widely used in fields such as PC streaming media, Internet Protocol television (Internet Protocol Television, IPTV), mobile streaming media, and video surveillance, and solves experience problems due to reasons such as insufficient network bandwidth, a large number of accesses, and uneven distribution of network nodes when a user accesses streaming media content.

In a CDN system, media servers are deployed to buffer media content and provide the user with a service nearby. There are a large number of users, and the performance of a media server is limited. Therefore, generally, a group of media services form a CDN node to provide media services for the users in an area. In addition, the content popularity on the CDN varies, so the CDN nodes are deployed at different layers on the CDN. That is, the content with high popularity is stored on the node that is deployed near the user side, and the content with low popularity is stored on the node that is deployed at a high layer and far from the user side.

Currently, all CDN systems widely deployed around the world use a closed architecture. One hierarchical multi-node CDN is provided uniformly by one CDN vendor. The CDN nodes provided by different vendors cannot implement interconnection and interworking, and the CDN nodes provided by a same vendor are not open to and cannot interconnect with the CDN nodes provided by other vendors. As a result, the cost for deploying a CDN is high. When several CDNs co-exist in a country, the content on those CDNs cannot be shared, so the delivery efficiency of utilizing those CDNs cannot be maximized.

The difficulties in the interconnection and interworking of CDNs provided by different vendors and opening of CDN nodes provided by a same vendor lie in inconsistent content delivery (including content PUSH and content PULL) protocols used by nodes on CDNs provided by each vendor. Streaming protocols used on the Internet are various, thus the protocols used by different node on CDNs are various, and some nodes may use proprietary protocols for transmission. Therefore, the interconnection and interworking of CDNs and the opening and interconnection of the CDN nodes to other CDN nodes cannot be implemented by unifying protocols.

FIG. 1 is a schematic diagram of interconnection and interworking among nodes on different CDNs. On different CDNs, that is, CDN 1 and CDN 2, the nodes are classified, according to their hierarchical positions on the network, into centre nodes, backbone nodes, and edge nodes, which are configured to store content with different frequency of access from users respectively. An edge node is configured to store the content accessed by users with high frequency. A backbone node is configured to store the content accessed by users with low frequency. A centre node is configured to store the content accessed by users with lower frequency. Because no unified protocols exist currently, it is difficult to implement the interconnection and interworking among nodes on different CDNs.

FIG. 2 is a schematic diagram of an open CDN architecture. Currently, because no standards exist, it is very difficult to open a CDN. In some areas, interworking is implemented by supporting interface protocols used by nodes on different CDNs. However, the content cannot be replicated to other CDNs on a large scale, and it is highly complicated to unify interaction protocols and implement interconnection among nodes on different CDNs.

FIG. 3 and FIG. 4 illustrate a solution for implementing interconnection and interworking among nodes on CDNs provided by different vendors.

As shown in FIG. 3, a standard Internet protocols are used for interconnection and interworking to implement the interconnection among nodes on the CDNs provided by different vendors. When various Internet terminals request media services by using different Internet protocols, a CDN A node (CDN A Node), after judging that it has no content, requests the content from a CDN B node (CDN B Node). In this case a media server on the CDN B Node may forward the request messages of the terminals to the media server on the CDN B Node in a Proxy way. In this case, the media server on the CDN B Node needs to parse different Internet protocol messages and use these Internet protocols to obtain content from the media server on the CDN BNode. Addition of one type of terminal means the possible addition of one Internet protocol. As a result, both the CDN A Node and the CDN B Node need to be modified accordingly to support a new Internet protocol.

As shown in FIG. 4, if the solution illustrated in FIG. 3 is used to interconnect backbone nodes or edge nodes on the CDNs provided by other vendors to implement the interconnection and interworking of the CDNs illustrated in FIG. 3, the nodes on the CDNs provided by other vendors need use various Internet protocols to implement cascading. When one type of Internet protocol is added, at least two nodes on different CDNs need to be modified to support a new protocol message.

If the interconnection solution illustrated in FIG. 3 and FIG. 4 is used, the nodes, which are on all the CDNs and need to be cascaded, need to support various Internet protocols. When one type of Internet protocol is added, two or more CDN nodes need to be modified to support a new protocol message. In addition, when one type of Internet protocol is added, the nodes, which are on all the CDNs and need to be cascaded, need to be modified to adapt to a new Internet protocol. However, some Internet protocols are not opened. When the nodes on the CDNs need to be cascaded, those Internet protocols, which are not opened, cannot be supported, that is, terminals that use those Internet protocols, which are not opened, cannot be supported.

FIG. 5 and FIG. 6 illustrate another solution for implementing interconnection and interworking among nodes on CDNs provided by different vendors.

As shown in FIG. 5, a unified interface protocol is defined at the application layer to implement the interconnection among the nodes on CDNs provided by different vendors. The unified interface protocol used by the nodes on a CDN A (CDN A) and a CDN B (CDN B) is defined to support the transmission of using different Internet protocols. When a media server on a CDN B node (CDN B Node) receives a request from a terminal, if no content is found locally, it converts this protocol to the unified interface protocol and sends the request to a media server on a CDN A node (CDN A Node). The media server on the CDN A node sends the content to the media server on the CDN B node by using the unified interface protocol to provide streaming media services for the terminal. Addition of one type of terminal means the possible addition of one Internet protocol. In this case, if the unified interface protocol may include all the content of a new protocol, there is no need to modify cascaded interfaces on the CDN A node and the CDN B node; if the unified interface protocol cannot entirely support a new Internet protocol, this unified interface protocol needs to be modified, so the CDN A node and the CDN B node need to modify part of their cascaded interfaces.

As shown in FIG. 6, if the solution illustrated in FIG. 5 is used to interconnect backbone nodes or edge nodes on CDNs provided by other vendors to implement the interconnection and interworking of CDNs illustrated in FIG. 5, a suite of unified interface protocols needs to be defined for supporting all Internet protocols at the application layer. The nodes on CDNs provided by different vendors use the unified interface protocols to implement cascading. When one type of Internet protocol is added, it needs to be judged whether this unified interface protocol is affected. If yes, the unified interface protocol needs to be modified, and at least two nodes on different CDNs need to be modified to support a new unified interface protocol.

As shown in FIG. 7, when either the interconnection solution illustrated in FIG. 3 and FIG. 4 or the interconnection solution illustrated in FIG. 5 and FIG. 6 is used, node interconnection on different CDNs is implemented at the application layers of media servers on CDN nodes. When a CDN A node (CDN A Node) needs to access content stored on a CDN B node (CDN B Node), the data flow is shown in FIG. 7. A media server on the CDN A node requests content from a media server on a remote CDN B node by using a media protocol. The media server on this CDN B node reads the content in a local content storage by using a standard interface provided on an operating system (Operating System, OS) and, after the content is obtained at the application layer, forwards the content to the media server on the CDN A node. When the content is transmitted between the media server on the CDN A node and the media server on the CDN B node, the interface of the operating system is invoked and the content is transmitted through a link layer (Link Layer), like all applications that need to send messages through a network port. In addition, storage networking and access vary with different storage networking mechanisms (such as NAS (network-attached storage), SAN (storage area network), and DAS (direct-attached storage)).

When the interconnection solution illustrated in FIG. 5 and FIG. 6 is used, a unified interface protocol needs to be defined to support all Internet protocols. It is very complicated to define this unified interface protocol because the interface protocol needs to support different transmission protocols, different file formats, and different coding formats. When one type of Internet protocol is added, it needs to be judged whether this unified interface protocol is affected. If yes, this interface protocol needs to be modified, and all the CDNs that need to be cascaded need to be modified to adapt to a new unified interface protocol. In addition, some Internet protocols are not opened and the unified interface protocol cannot support those Internet protocols that are not opened, that is, terminals that use those Internet protocols, which are not opened, cannot be supported.

To sum up, difficulties in implementing the interconnection and interworking among the nodes on different CDNs are as follows:

1. As there are a variety of Internet protocols, it is complicated that the media servers on the nodes on different CDNs or on a same CDN are compatible with all the Internet protocols.

2. The interconnection and interworking among the nodes on different CDNs or on a same CDN rely on the implementation of various Internet protocols, or defining a complicated unified interface protocol that is compatible with all Internet protocols.

3. Currently, a method used to interconnect and interwork with the nodes on different CDNs is closely related to the Internet protocols. With the addition and change of the Internet protocols, the CDN nodes need to be modified constantly to adapt to new Internet protocols.

SUMMARY OF THE INVENTION

To solve the preceding problems, embodiments of the present invention use the following technical solutions:

An embodiment of the present invention provides a content delivery network (CDN). This CDN includes a first-level CDN node that is formed of a first CDN media server and a first CDN content storage and is configured to provide content for a user, and a second-level CDN node that is formed of a second CDN media server and a second CDN content storage and interconnects with the first-level CDN node, where the first CDN media server accesses the content in the second CDN content storage by using an IP-layer storage access protocol.

In this embodiment, the second-level CDN node is an upper-level node of the first-level CDN node.

In this embodiment, if the first CDN content storage and the second CDN content storage have the same content, and if the same content needs to be accessed, the first CDN media server preferably accesses the first CDN content storage.

In this embodiment, the first CDN media server, by mounting (LUN Mount) a logical storage unit in the first CDN content storage, generates a first content index corresponding to the logical storage unit in the first CDN content storage.

In this embodiment, the first CDN media server, by using an IP-layer storage access protocol and mounting (LUN Mount) on the logical storage unit in the second CDN content storage, generates a second content index corresponding to the logical storage unit in the second CDN content storage.

In this embodiment, when receiving, from a user, a request for accessing content, the first CDN media server searches the first content index and the second content index to obtain the CDN content storage where requested access content is located. When the requested access content is stored in the first CDNcontent storage, the first CDN media server obtains the requested access content from the first CDN content storage. When the requested access content is stored in the second CDN content storage, the first CDN media server accesses the second CDN content storage by using the IP-layer storage access protocol to obtain the requested access content.

In this embodiment, the IP-layer storage access protocol is the Internet Small Computer System Interface (iSCSI) protocol.

An embodiment of the present invention further provides a content delivery network, including a first content delivery network and a second content delivery network.

The first content delivery network includes a first-level CDN node that is formed of a first CDN media server and a first CDN content storage and is configured to provide content for a user. The second content delivery network includes a second-level CDN node that is formed of a second CDN media server and a second CDN content storage and interconnects with the first-level CDN node. The first CDN media server accesses the content in the second CDN content storage by using an IP-layer storage access protocol.

An embodiment of the present invention further provides an edge node on a content delivery network, including a first CDN media server and a first CDN content storage. The edge node interconnects with a backbone node on the content delivery network. The backbone node is formed of a second CDN media server and a second CDN content storage, where the first CDN media server accesses content in the second CDN content storage by using an IP-layer storage access protocol.

An embodiment of the present invention further provides an edge node on a content delivery network, including a first CDN media server and a first CDN content storage. The edge node interconnects with a centre node on the content delivery network. The centre node is formed of a second CDN media server and a second CDN content storage, where the first CDN media server accesses content in the second CDN content storage by using an IP-layer storage access protocol.

An embodiment of the present invention further provides a method for node interconnection on a content delivery network (CDN), including: a first CDN media server on a first-level CDN node accesses a first CDN content storage and generates a first content index that corresponds to a logical storage unit in the first CDN content storage, and a first CDN media server on a first-level CDN node accesses a second CDN content storage on a second-level CDN node by using an IP-layer storage access protocol and generates a second content index that corresponds to the logical storage unit in the second CDN content storage.

The first CDN media server on the first-level CDN node receives, from a user, a request for accessing content. The first CDN media server on the first-level CDN node searches the first content index and the second content index to obtain the CDN content storage where the requested access content is located. When the requested access content is stored in the second CDN content storage, the first CDN media server accesses the second CDN content storage by using an IP-layer storage access protocol to obtain the requested access content.

In this embodiment, if the requested access content is stored in both the first CDN content storage and the second CDN content storage, the CDN media server preferably obtains the requested access content from the first CDN content storage.

In this embodiment, the first CDN media server accesses the first CDN content storage by using the IP-layer storage access protocol.

In this embodiment, the IP-layer storage access protocol is the iSCSI protocol.

An embodiment of the present invention further provides a content delivery network, including an edge node, a backbone node, and a centre node, which are configured to store content with different popularity of access from users respectively, and further including a delivery node, where content storages are deployed on the edge node, the backbone node, and the centre node, and a media server is deployed on the delivery node. The media server accesses the content storages on the edge node, the backbone node, and the centre node by using an IP-layer storage access protocol.

In this embodiment, priorities for accessing the content storages on the edge node, the backbone node, and the centre node are set in the media server. The media server searches for content according to the priorities and provides the content for a user.

Analysis on technical effects of the preceding embodiments is as follows: when stored content is accessed among nodes on different CDNs or on a same CDN, the application layer of a media server on a CDN node is not involved, and a remote IP-layer storage access mechanism is used for remote sharing of stored content among the nodes on different CDNs or on a same CDN. An operating system layer cooperates with a content storage to implement a storage protocol. Therefore, for a CDN streaming media application, the content on other CDN nodes may be accessed without modifying the nodes on different CDNs, like in accessing local content. In this way, the networking is simplified, and the content access efficiency and the resource utilization are improved.

DETAILED DESCRIPTION OF THE EMBODIMENTS

The following describes embodiments of the present invention in detail with reference to the accompanying drawings.

According to the solutions described in the background of the present invention, currently, either each Internet protocol at the application layer or a common unified protocol at the application layer is used, cascading among nodes on different CDNs is implemented by using the applications of a media server on a CDN node. In the present invention, the application layer of the media server on the CDN node is not involved when stored content on the nodes on different CDNs or on a same CDN is accessed, and an IP-layer storage access protocol is used to implement remote sharing of the content among various nodes on different CDNs by using a remote storage access mechanism at the Internet Protocol (Internet Protocol, IP) layer. An operating system layer cooperates with a content storage to implement a storage protocol. Therefore, for a CDN streaming media application, the content on other CDN nodes may be accessed without modifying the nodes on different CDNs, like in accessing local content. Embodiments of the present invention relate to the application layer, IP layer, and link layer, which are with reference to the seven-layer Open System Interconnect (Open System Interconnect, OSI) structure or the four-layer Transmission Control Protocol/Internet Protocol (Transmission Control Protocol/Internet Protocol, TCP/IP) structure.

Figure 1:
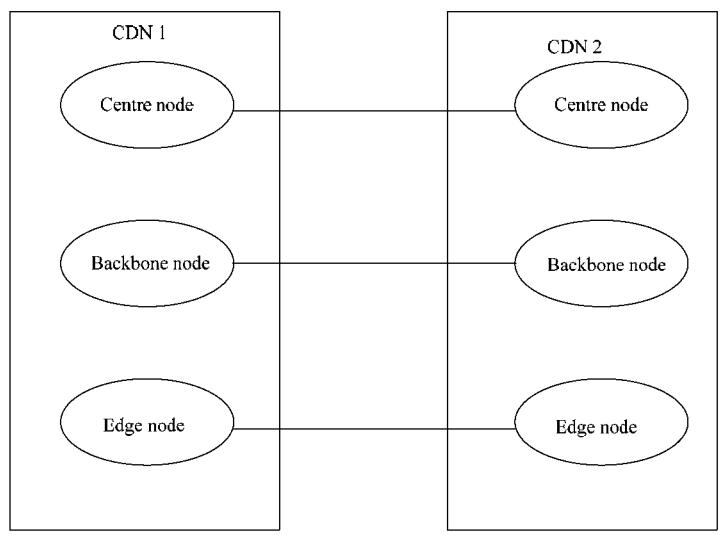
FIG. 1 is a schematic diagram of networking architecture for interconnection and interworking among nodes on different content delivery networks (CDNs) in the prior art.
Figure 2:
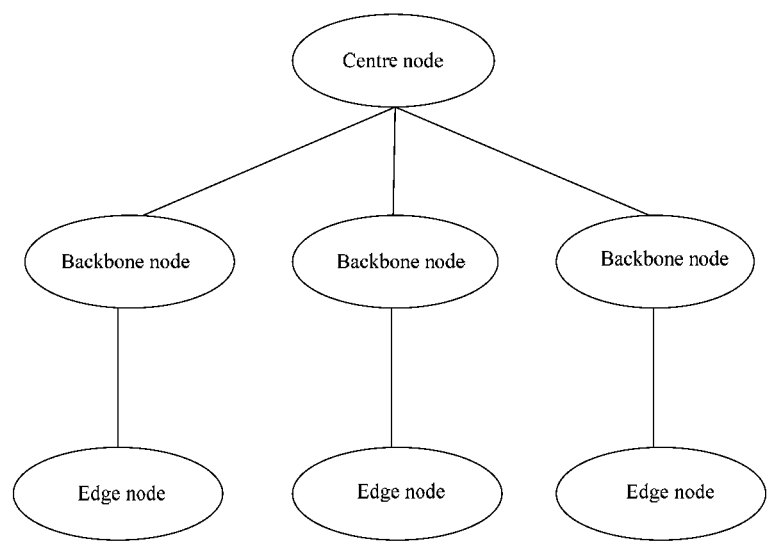
FIG. 2 is a schematic diagram of an open CDN architecture in the prior art.
Figure 3:
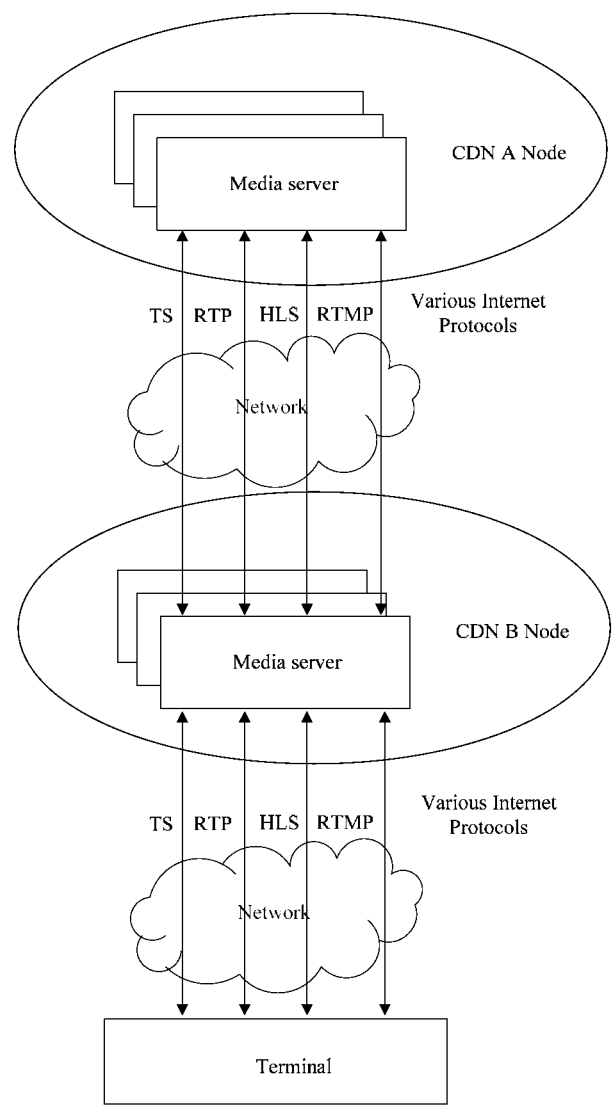
FIG. 3 is a schematic diagram of a part of networking architecture for implementing interconnection and interworking among nodes on CDNs provided by different vendors in the prior art.
Figure 4:
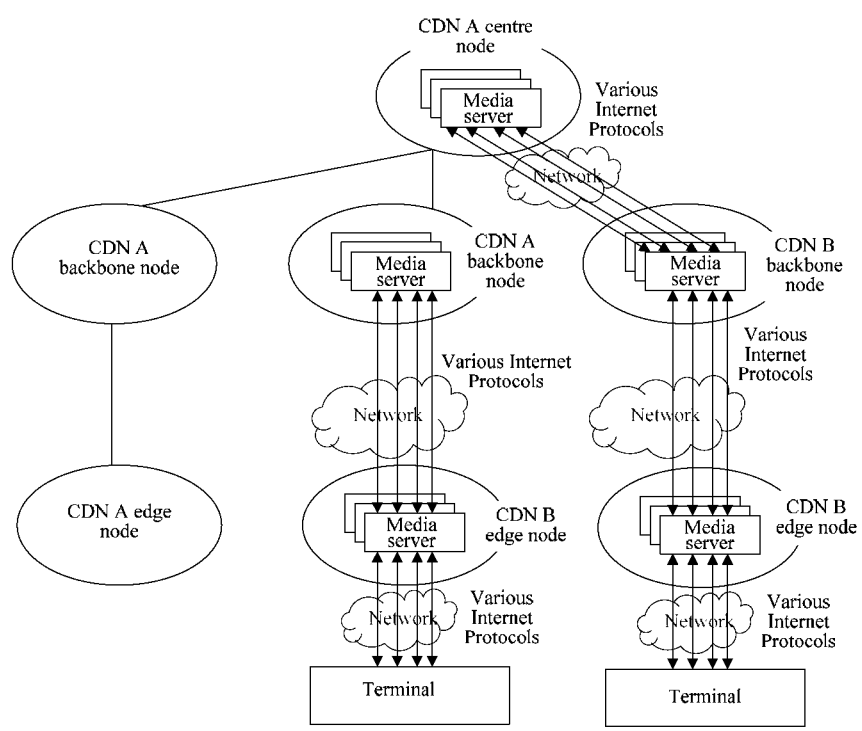
FIG. 4 is a schematic diagram of a global networking architecture for implementing interconnection and interworking among nodes on CDNs provided by different vendors in the prior art.
Figure 5:
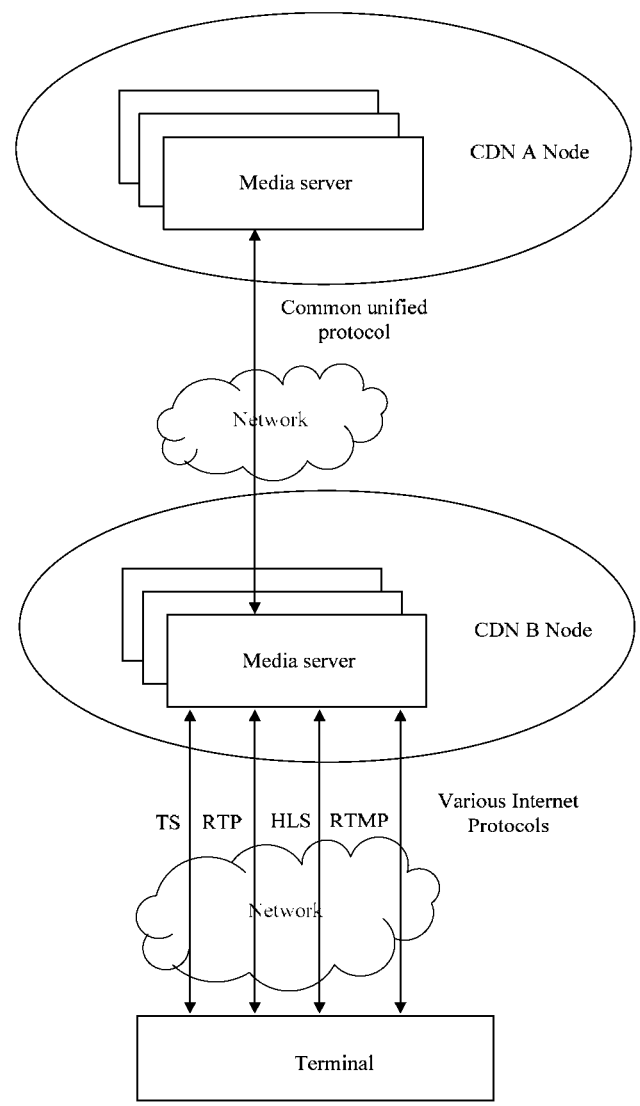
FIG. 5 is a schematic diagram of a part of another networking architecture for implementing interconnection and interworking among nodes on CDNs provided by different vendors in the prior art.
Figure 6:
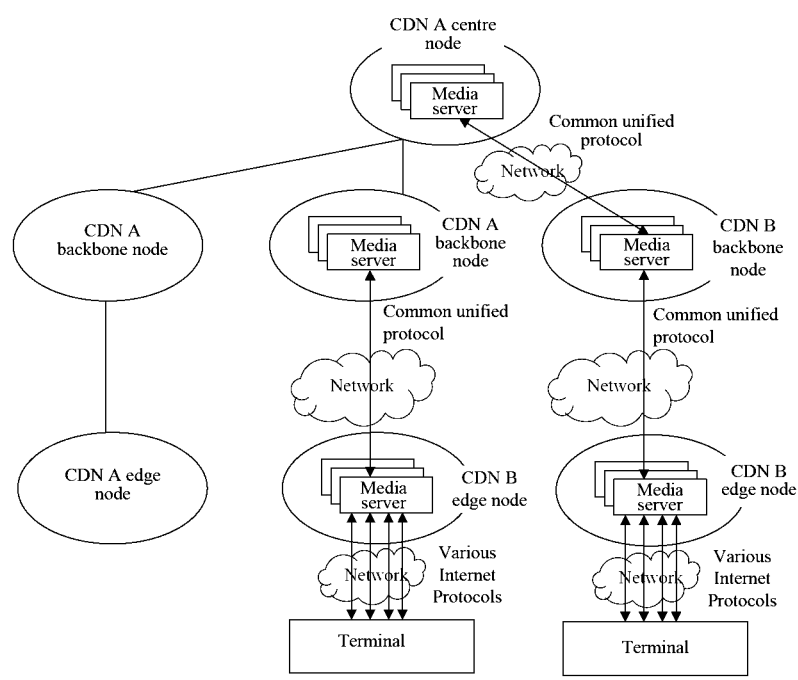
FIG. 6 is a schematic diagram of another global networking architecture for implementing interconnection and interworking among nodes on CDNs provided by different vendors in the prior art.
Figure 7:
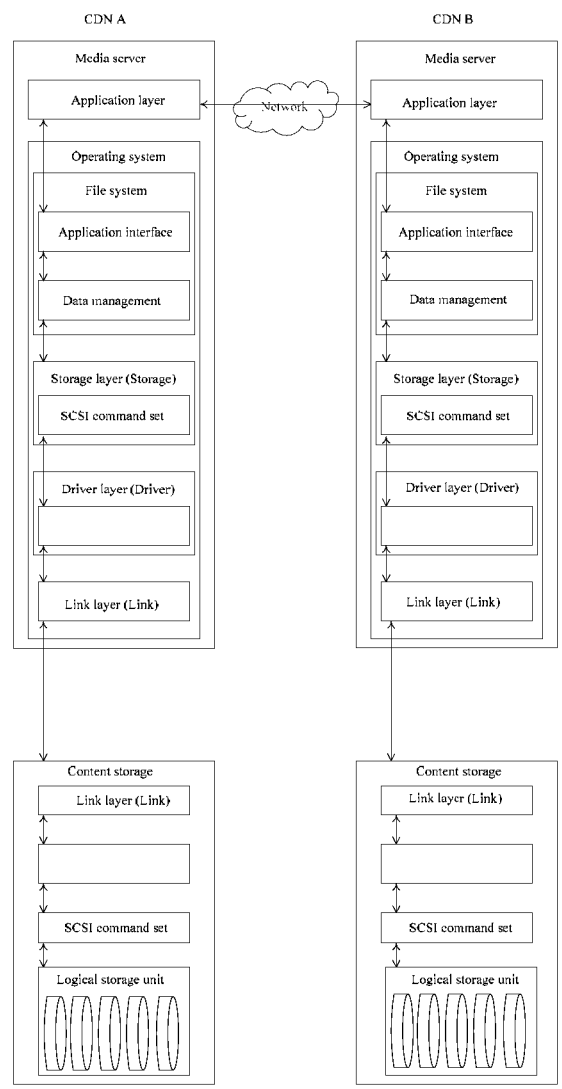
FIG. 7 is a schematic structural diagram of implementing the interconnection among nodes on different CDNs at the application layer of a media server in the prior art.
Figure 8:
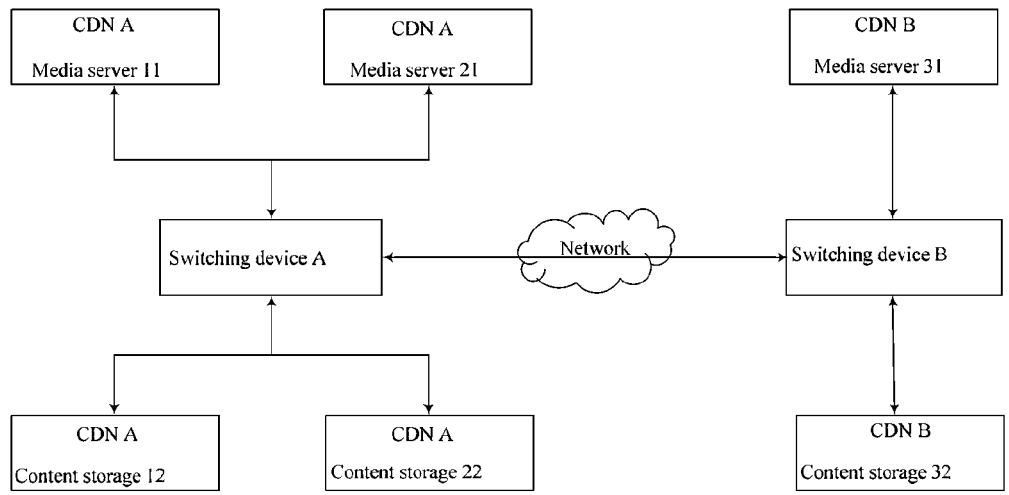
FIG. 8 is a schematic structural diagram of implementing, based on an IP SAN storage structure, the interconnection among nodes on different CDNs, according to an embodiment of the present invention.

As shown in FIG. 8, an IP SAN (Storage Area Network, storage area network) storage structure is used as an example. A CDN A (CDN A) node includes a media server 11 and a corresponding content storage 12, a media server 21 and a corresponding content storage 22, and a switching device A configured to exchange data between the media servers 11 and 21 and the content storages 12 and 22. A CDN B (CDN B) node includes a media server 31 and a corresponding content storage 32, and a switching device B configured to exchange data between the media server 31 and the content storage 32. Particularly, this switching device A may access the switching device B by using an IP-layer storage access protocol. The following specifically describes how the media server 11 on the CDN A node accesses a local content storage 12 and the content storage 32 on the CDN B node with reference to FIG. 9.

Figure 9:
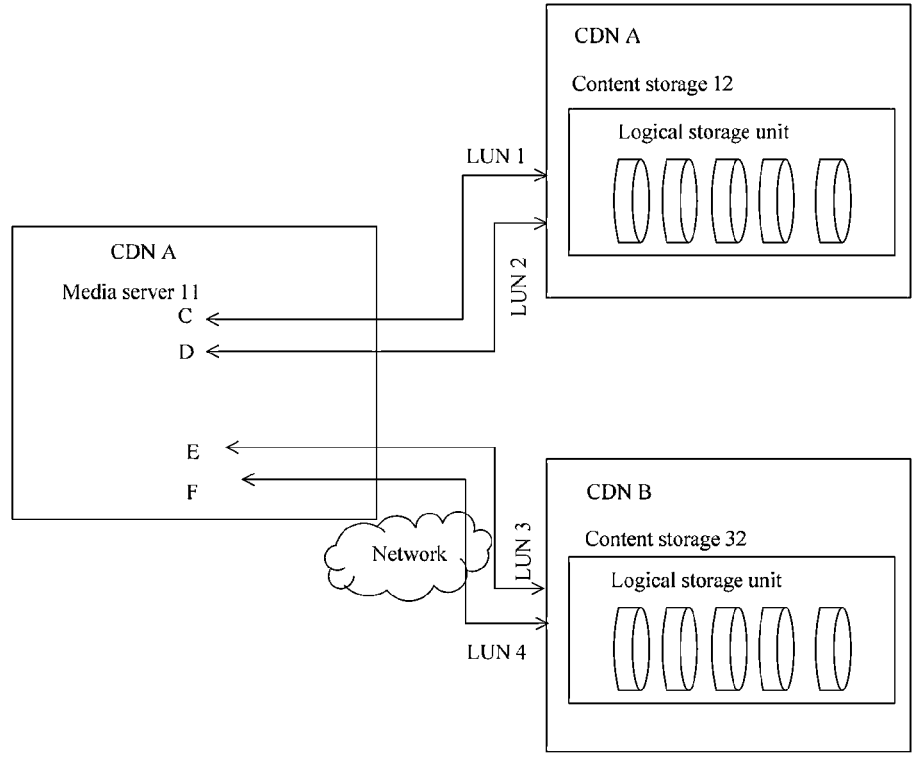
FIG. 9 is a conceptual diagram of accessing, by a media server on a CDN node, a local content storage of the node and a content storage on a node on other CDNs according to an embodiment of the present invention.

As shown in FIG. 9, if the media server 11 on the CDN A node accesses the local content storage 12 of the node, logical storage units in the local content storage 12 need to be mounted (for example, LUN (logical unit number) mounted) to the local media server 11 first and drive letters C and D corresponding to the logical storage units are set. In this way, the media server 11 is capable of accessing media content in the local content storage 12. To access content on the remote CDN B node, similarly, the content storage 32 on the CDN B node is mounted (LUN mount) to the media server 11 on the CDN A, and corresponding drive letters E and F is configured. In this way, the media server 11 on the CDN A is capable of accessing the content storage 32 on the CDN B. A plurality of drive letters, which may be found on the media server 11 on the CDN A, correspond to a plurality of logical storage units in the content storage 12 on the CDN A and a plurality of logical storage units in the content storage 32 on the CDN B. For an application on the media server 11 on the CDN A, the logical storage units corresponding to the local content storage 12 are preferably searched according to a predefined policy only. If no content is found in these logical storage units, the logical units corresponding to the content storage 32 on the CDN B are searched. That is, on a local CDN, a local node preferably provides services, and if the local node has no content, the local node obtains the content from a remote node, and then provides services.

Figure 10:
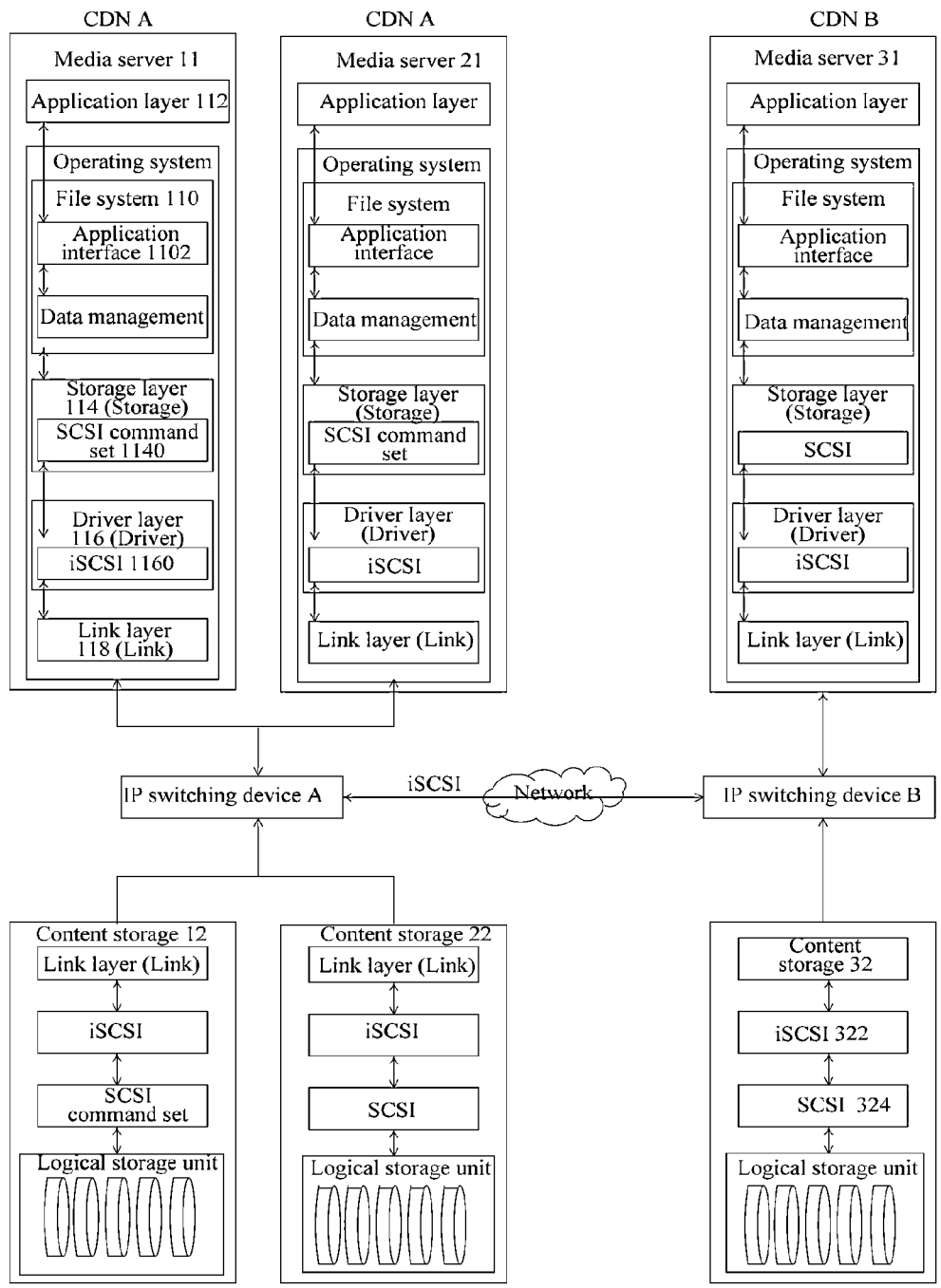
FIG. 10 is a schematic structural diagram of implementing interconnection among nodes on different CDNs, based on an IP SAN storage structure and by using an IP-layer storage access protocol according to an embodiment of the present invention.

FIG. 10 illustrates an IP SAN architecture as an example, and specifically describes how to implement an access by the media server 11 on the CDN A node to the content storage 32 on the CDN B node. An IP protocol, for example, an Internet Small Computer System Interface (Internet Small Computer System Interface, iSCSI) protocol, is used for transmission of the media content in a storage medium to implement the access by the media server 11 on the CDN A node to the content storage 32 on the CDN B node. The iSCSI protocol is an end-to-end protocol used for transmission of a storage I/O (input/output) data block on an IP network. This protocol is used in a server (initiator), a storage device (target), and a protocol transmission gateway device. Based on the iSCSI protocol, data is transferred from the server to the storage device by using a standard Ethernet switch and a router. In addition, due to the iSCSI protocol, an IP infrastructure and an Ethernet infrastructure may be used to implement an expansion access to a SAN storage system and complete the expansion access to the SAN across any distance.

If the media server 11 on the CDN A node accesses the content storage 32 on the CDN B node, the logical storage units in the content storage 32 on the CDN B are mounted (LUN mount) to the media server 11 on the CDN A first. The specific solution is illustrated in FIG. 9. In this case, the media server 11 on the CDN A may use an application interface 1102 provided by a file system 110 illustrated in FIG. 10 to access a remote content storage 32. The specific steps are as follows:

An application layer 112 on the CDN A invokes a file read/write interface on the file system 110.

The file system 110 invokes a universal SCSI command set 1140 at a storage layer 114, and accesses the remote content storage 32 by using the unit of block.

An iSCSI driver 1160 at a driver layer 116 uses the iSCSI protocol to encapsulate the SCSI command set 1140, and invokes an interface at a link layer (Link) 118 to send or receive a storage access message. The iSCSI protocol is based on a TCP message. Therefore, the remote content storage 32 on the CDN B may be accessed by using an IP switching device A, an IP switching device B, and an IP network.

The encapsulation based on the IP-layer protocol is implemented at the link layer 118, and a read/write message is sent to the remote content storage 32 through a network port. Because IP packet encapsulation is implemented at the link layer 118, the read/write operations on a block are encapsulated into a plurality of IP packets at the link layer 118 for transmission.

The IP packets are transmitted to the storage device on the remote CDN B by using the IP switching device A and the IP switching device B.

After the link layer 320 of the content storage 32 on the CDN B receives an iSCSI message, and after decapsulation and conversion to an SCSI command set by using the iSCSI 322 and the SCSI 324, the media data is read or written in from the local logical storage units, thereby implementing the access to the remote content storage 32.

After node interconnection on different CDNs is implemented by using the preceding methods, it only needs to make the CDNs that need to be cascaded use an IP-based storage solution. For example, both an IP SAN solution and a network attached storage (Network attached storage, NAS) solution may be used to implement the interconnection among the nodes on different CDNs. According to the method, if a new Internet protocol is brought in due to a newly introduced terminal, only the node providing CDN services needs to be compatible with the interface of the terminal. An interconnection message among nodes on different CDNs is converted to access to a remote storage. After this access is implemented based on standard storage networking, it is shielded by the operating system layer. Therefore, the purpose for remote interconnection is implemented without finding, by the application of the CDN node, which protocol is used at the system layer, and the CDN application does not need to be modified due to an added Internet protocol.

In the embodiments described in FIG. 8-FIG. 10, the CDN A node, and its included media server and content storage respectively correspond to a first-level CDN node, an included first CDN media server, and an included first CDN content storage. The CDN B node, the included media server, and the included content storage respectively correspond to a second-level CDN node, an included second CDN media server, and an included second CDN content storage. The first-level CDN node and the second-level CDN node may be nodes located at a same network layer, for example, edge nodes, or may be nodes located at different network layers, for example, an edge node and a backbone node respectively. In addition, the technical solutions described in FIG. 8-FIG. 10 are not only applicable to the interconnection among nodes on different CDNs, but also applicable to the interconnection among different nodes on a same CDN, whose interconnection method is the same as the interconnection method of nodes on different CDNs.

Figure 11:
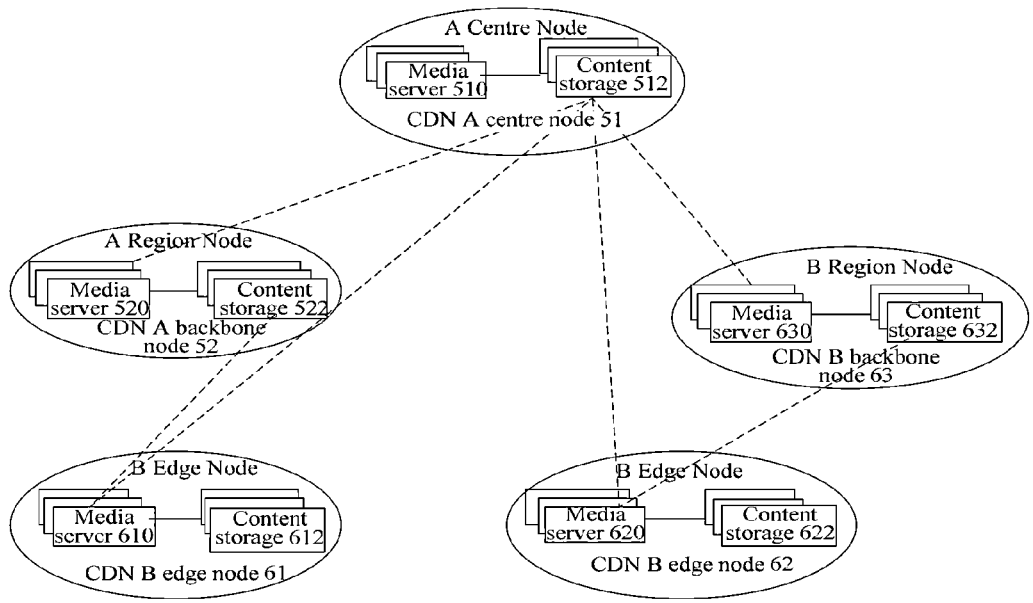
FIG. 11 is a schematic structural diagram for implementing interconnection and interworking inside a CDN and among different CDNs according to an embodiment of the present invention.

FIG. 11 illustrates a case for implementing interconnection and interworking inside a CDN and among different CDNs by using a technical solution provided in the present invention. In this case, a lower-level node (for example, an edge node 61 on a CDN B) needs to mount (LUN Mount) a storage of an upper-level node (for example, a content storage 522 on a backbone node and a content storage 512 on a centre node 51 on a CDN A) to a lower-level media server (for example, a media server 610 on an edge node 61 on the CDN B), thereby implementing access to upper-level storage media content. If logical storage units in a local content storage 612 on the edge node 61 correspond to drive letters C and D, if mounted logical storage units in the content storage 522 on a backbone node 52 correspond to drive letters E and F, and if mounted logical storage units in the content storage 512 on the centre node 51 correspond to the drive letters G and H, priority orders for the media server 610 on the edge node 61 searching for content are as follows: C and D take precedence over E and F, and E and F take precedence over G and H. The content under any one directory is found, according to the orders, for providing a media service. Similarly, when the same content is stored in both the logical storage units corresponding to the drive letters C and D and the logical storage units corresponding to the drive letters E and F, the media server 610 preferably obtains the content from the logical storage units corresponding to the drive letters C and D, that is, obtaining the content from the local content storage 612 by using an IP-layer storage access protocol. In addition, the present invention provides a method of generating a corresponding drive letter by mounting. This drive letter method is one of content index methods, where the drive letters C and D correspond to a first content index, and the drive letters E and F or the drive letters G and H correspond to a second content index. The media server searches the first content index and the second content index for the content one by one. In other embodiments in the present invention, the method is not limited to the drive letter method, and may be methods such as a corresponding table of the content and a mapping table of the content.

Figure 12:
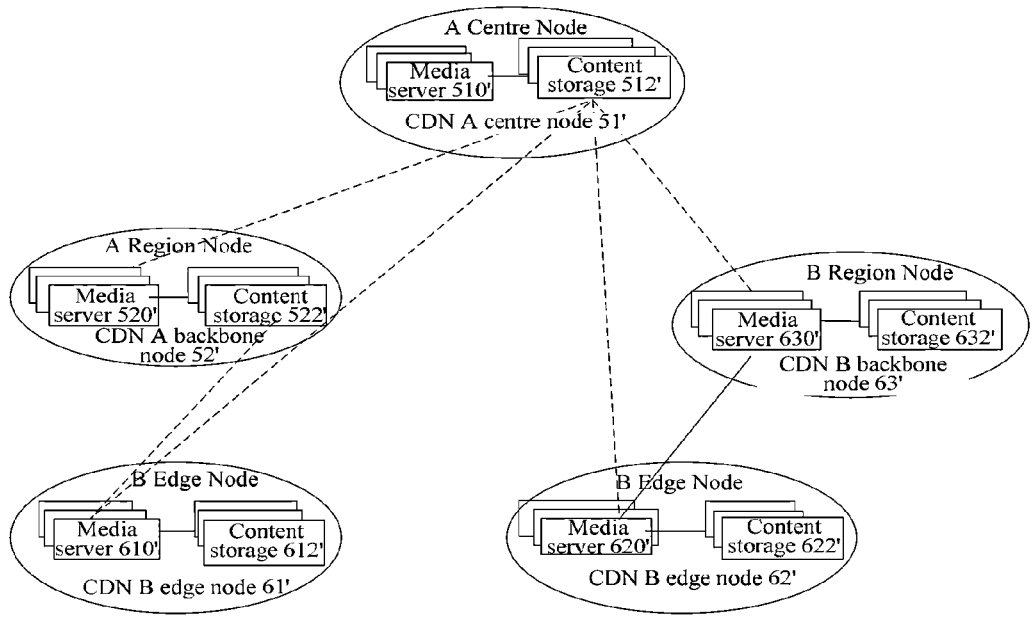
FIG. 12 is a schematic structural diagram for implementing interconnection and interworking inside a CDN and among different CDNs according to another embodiment of the present invention.

FIG. 12 illustrates another case for implementing interconnection and interworking inside a CDN and among different CDNs by using a technical solution provided in the present invention. In this case, the interconnection and interworking on different CDNs is implemented according to the method provided in the present invention. The interconnection and interworking inside a same CDN may further be implemented by using streaming interfaces among applications of a media server. In FIG. 12, dashed lines indicate that a media server 610' on an edge node 61' on a CDN B accesses a content storage 522' on a backbone node 52' and a content storage 512' on a centre node 51' on a CDN A by using an IP-layer storage access protocol; a media server 620' on an edge node 62' on the CDN B accesses the content storage 512' on the centre node 51' on the CDN A by using an IP-layer storage access protocol; and a media server 630' on a backbone node 63' on the CDN B accesses the content storage 512' on the centre node 51' on the CDN A by using an IP-layer storage access protocol. Solid lines indicate that the application of a media server 520' on the backbone 52' on the CDN A accesses a media server 510' on the centre node 51' on the CDN A by using an application-layer streaming protocol and accesses a local content storage 522; and the application of the media server 620' on the edge node 62' on the CDN B accesses the media server 630' on the backbone node 63' on the CDN B by using an application-layer streaming protocol and accesses a local content storage 622'.

In the embodiments described in FIGS. 11-12, the CDN A node, and its included media server and content storage respectively correspond to a first-level CDN node, an included first CDN media server, and an included first CDN content storage. The CDN B node, and its included media server and content storage respectively correspond to a second-level CDN node, an included second CDN media server, and an included second CDN content storage. The first-level CDN node and the second-level CDN node may be nodes located at a same network layer, for example, edge nodes, or may be nodes located at different network layers, for example, an edge node and a backbone node respectively. In addition, the technical solutions described in FIGS. 11-12 are not only applicable to the interconnection among nodes on different CDNs, but also applicable to the interconnection among different nodes on a same CDN, whose interconnection method is same as the interconnection method of nodes on different CDNs.

Based on the consideration of storage consistency, when a plurality of media servers access a same content storage, an arbiter server is needed to ensure that only one media server modifies media data in this content storage at the same time. Therefore, the local media server for home storage may be set so that the local media server has full permission for this content storage and the media servers on other remote nodes can only perform read operation on this storage but not modify data in the storage. This may be implemented by configuring corresponding different priorities for different media servers when a logical storage unit is mounted by using the IP-layer storage access protocol, without involving the application layer.

Figure 13:
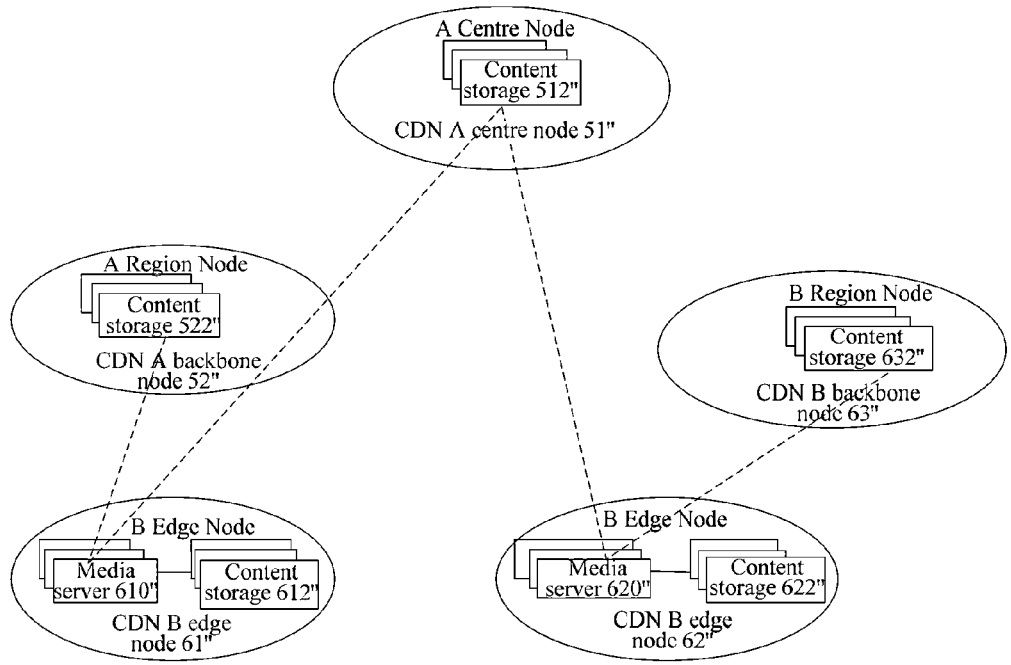
FIG. 13 is a schematic structural diagram for implementing interconnection and interworking inside a CDN and among different CDNs according to another embodiment of the present invention.

Actually, when the interconnection among CDN nodes is all implemented by using remote mounting connection, there is no need to deploy media servers on a non-edge node, instead, the media servers are all deployed on an edge node near a user. As shown in FIG. 13, after the media servers are all deployed on an edge node 61" and an edge node 62", a local content storage 612" on the edge node 61", a content storage 522" on a backbone node 52", and a content storage 512" on a centre node 51" are all mounted (LUN Mount) to the media server 610" on the edge node 61"; and a local content storage 622" on the edge node 62", a content storage 632" on a backbone node 63", and the content storage 512" on the centre node 51" are all mounted (LUN Mount) to the media server 620" on the edge node 62'. In this case, when providing services for a user, the media server still searches storage content under corresponding directories one by one.

For both the interconnection among nodes on different CDNs and the interconnection among nodes on a same CDN, the above technology can be used.

For the media servers on the nodes deployed at different layers, an intelligent adjustment to content delivery needs to be implemented, so the content storage on the edge node stores the most popular content and more users can hit the edge node. For example, the media server on the edge node has a plurality of directories described as follows:

E1-En: edge storage
R1-Rn: region storage
C1-Cn: centre storage

The media server may calculate and record the popularity of accessing each storage content by the users, keep the most popular content stored in E1-En, the second most popular content stored in R1-Rn, and other unpopular stored content in C1-Cn. When content adjustment needs to be implemented, for example, copying some content of R1-Rn or C1-Cn to E1-En, only corresponding copy operation needs to be performed. It needs to be noted that the media server on the edge node only has full permission for E1-En, so it is only capable of performing read/write operations on E1-En, but cannot perform modification on R1-Rn and C1-Cn.

Figure 14:
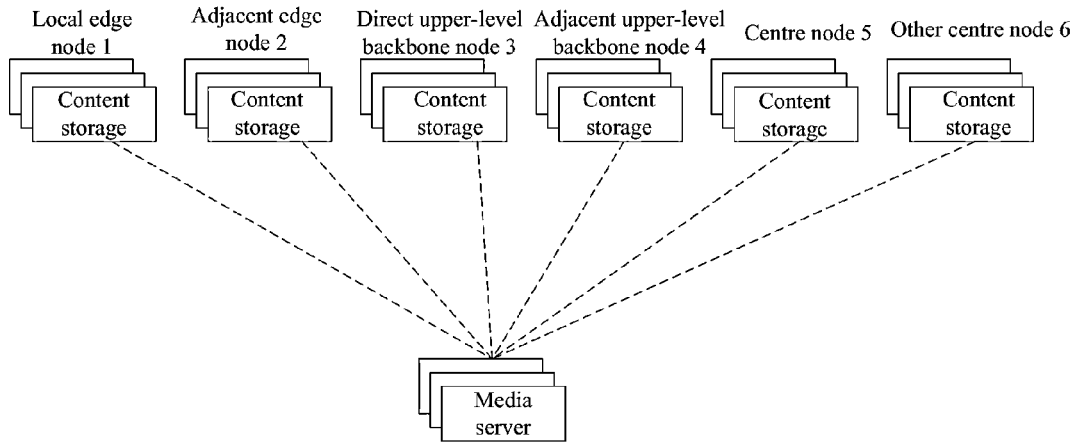
FIG. 14 is a schematic structural diagram of a media server that is on an edge node on a CDN and is mounted with a content storage on other nodes according to an embodiment of the present invention.

CDN architecture varies, which may be a tree structure, a mesh structure or other irregular structures. The CDN node interconnection technologies provided in the present invention are applicable to any CDN networking case. As shown in FIG. 14, for a media server on an edge node, a content storage on a local edge node 1, the content storage on an adjacent edge node 2, the content storage on a direct upper-level region node 3, the content storage on an adjacent upper-level region node 4, the content storage on a centre node 5, and the content storage on other centre node 6 may be mounted one by one to this media server. The media server queries according to an order and provides services for a user. That is, the local node first provides services, then the adjacent edge node of a region node provides services, then a direct upper-level backbone node provides services, then an adjacent upper-level backbone node provides services, then the centre node provides services, and then other centre nodes provide services. Different CDN route may be implemented based on different mounting orders.

Figure 15:
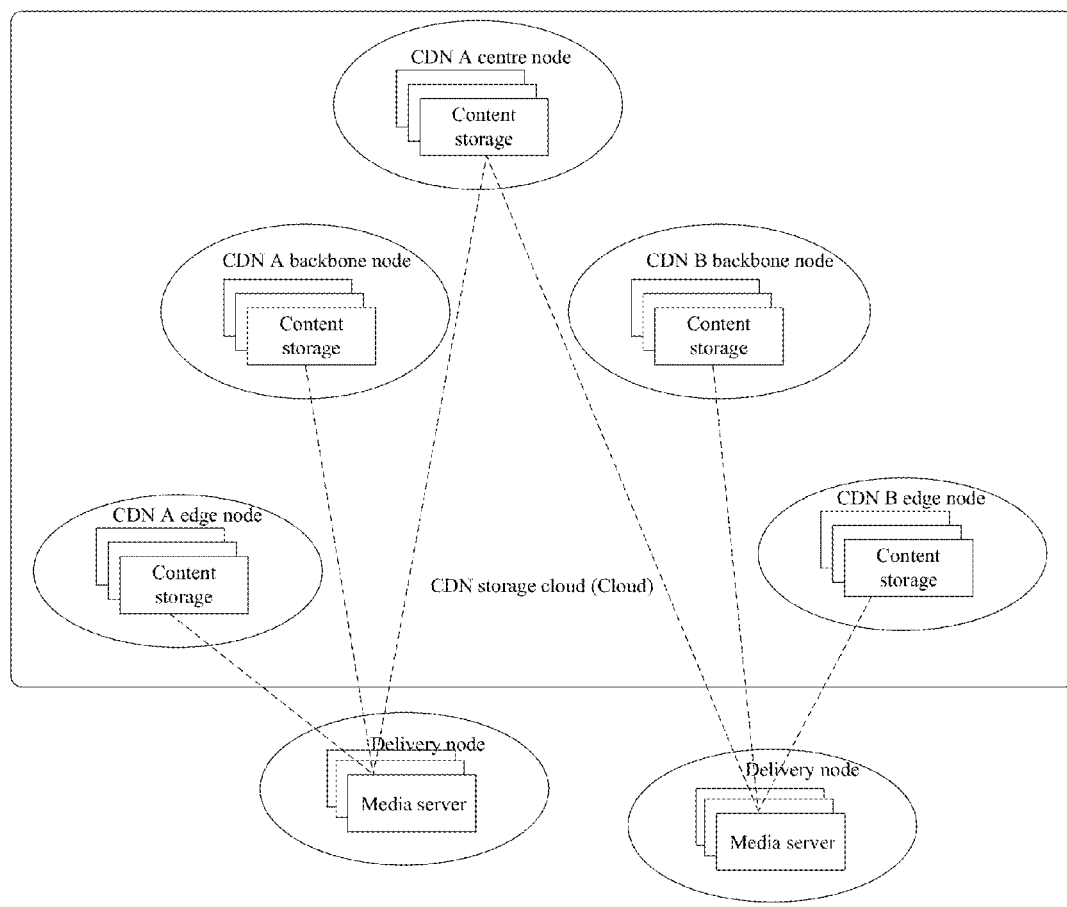
FIG. 15 is a schematic structural diagram of a CDN storage cloud (Storage Cloud) networking architecture according to an embodiment of the present invention.

As shown in FIG. 15, when solutions provided in the present invention are used to form a CDN, content storages are deployed on edge nodes, backbone nodes, and centre nodes, and media servers are deployed on delivery nodes (Delivery Nodes). The content storages on each node independently form a storage cloud (Storage Cloud) without limiting the networking of this storage cloud, which may be a tree storage cloud, a mesh storage cloud, or a storage cloud with other networking forms. A storage type is not limited either. The media servers independently form delivery nodes, mounting the content storages on nodes in different network positions one by one and providing services for a user. The media server on the delivery node only needs to support an IP-layer storage access protocol and then may mount a plurality of remote content storages according to configurations and access the CDN. This further means that the media servers that use mainstream operating systems are capable of accessing the CDN seamlessly and form a CDN together. These media servers only need to support the setting of the service priority for accessing these content storages, search for content according to the priority, and provide services for the user.

Figure 16:
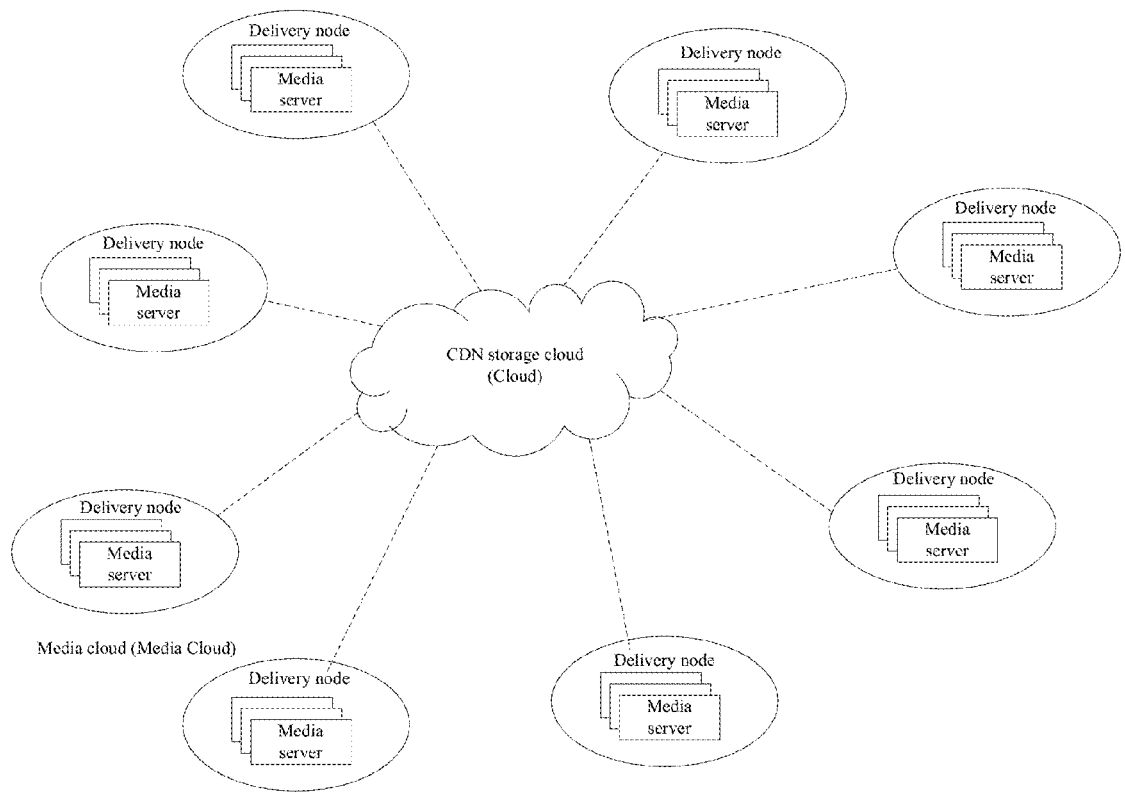
FIG. 16 is a schematic structural diagram of another media cloud (Media Cloud) networking architecture according to an embodiment of the present invention.

When various media servers in FIG. 16 interconnect with a CDN storage cloud to form a complete CDN, actually a media cloud (Media Cloud) network is formed. Various Internet terminals are routed, according to a normal CDN scheduling mechanism, to a nearest media server that provides services. Actually, the media cloud is formed of multiple media servers on a plurality of delivery nodes and various content storages on a plurality of nodes. A terminal does not sense differences between media servers and content storages on different nodes. Therefore, the media cloud is actually formed.

According to solutions provided in the present invention for implementing interconnection among nodes on a CDN, a media server on a node uses an IP-layer storage access protocol to access a local content storage and the remote content storages on other nodes and obtain content from the remote content storages on other nodes when the local content storage mounted on the media server has no corresponding content, and provides services for a user. This method uses a standard file read/write interface on an operating system to access the local and remote content storages though the IP-layer storage access protocol, therefore, this method avoids a problem on complicated implementation of interconnection among media servers on different nodes, which is due to a variety of Internet protocols.

A complete CDN may be built and the internal interconnection and interworking on the CDN is simplified by using this method.

According to this method, both the media server and the content storage use the standard IP storage access protocol. Therefore, various media servers and various content storages that comply with the protocol are capable of using this method for interconnection and forming a media cloud network.

This method may be applicable to any scenario where nodes that are on CDNs of different vendors and need to be cascaded. The difference only lies in the application delivery of the media server on the CDN node and adaptability modification on a scheduling mechanism. However, the mechanism for implementing cascading among nodes on different CDNs does not need to be modified.

This method is not related to the Internet protocols, and solves a variety of problems on Internet protocols. Adding an Internet terminal protocol interface does not impact on the cascading among nodes on the CDN. Therefore, adaptive modification is not needed. In addition, this method is not related to the Internet protocols, but solves problems on impossible interconnection among nodes, which are due to some Internet protocols that are not opened.

Persons skilled in the art should understand that the preceding methods of implementing node interconnection on a CDN may be implemented by a program instructing relevant hardware. The program may be stored in a readable storage medium. When the program is run, the corresponding steps of the preceding methods are performed. The storage medium may be a ROM, a RAM, a magnetic disk, an optical disk, and the like.

The foregoing descriptions are exemplary embodiments for illustrating the present invention. It should be noted that persons skilled in the art may still make improvements and polish without departing from the principles of the present invention. These improvements and polish also fall within the protection scope of the present invention.

What is claimed is:

1. A content delivery network (CDN), comprising:
a first-level CDN node that includes a first CDN media server and a first CDN content storage, and is configured to provide content for a user, wherein the first CDN media server generates a first content index corresponding to a logical storage unit in the first CDN content storage by mounting a logical storage unit in the first CDN content storage; and
a second-level CDN node that includes a second CDN media server and a second content storage, and interconnects with the first-level CDN node, wherein:
the first CDN media server accesses the content in the second CDN content storage by using an IP (Internet Protocol) layer storage access protocol;
wherein the first-level CDN node includes one of an edge node and a backbone node;
wherein the second-level CDN includes one of a backbone node and a centre node, and, wherein the second-level CDN node is an upper-level node of the first-level CDN node.

2. The network according to claim 1, wherein if the first CDN content storage and the second CDN content storage have same content and if the first CDN media server accesses the same content, then the first CDN media server preferably accesses the first CDN content storage.

3. The network according to claim 1, wherein the first CDN media server generates a second content index corresponding to the logical storage unit in the second CDN content storage by using an IP layer storage access protocol and mounting the logical storage unit in the second CDN content storage.

4. The network according to claim 3, wherein:
when receiving, from a user, a request for accessing content, the first CDN media server searches the first content index and the second content index to obtain a CDN content storage where requested access content is located;
when the requested access content is stored in the first CDN content storage, the first CDN media server obtains the requested access content from the first CDN content storage; and
when the requested access content is stored in the second CDN content storage, the first CDN media server accesses the second CDN content storage by using the IP layer storage access protocol to obtain the requested access content.

5. The network according to claim 1, wherein the IP layer storage access protocol is an Internet Small Computer System Interface (iSCSI) protocol.

6. The network according to claim 1, wherein:
a second content delivery network comprises a second-level CDN node that is formed of a second CDN media server and a second CDN content storage and interconnects with the first-level CDN node; and
the first CDN media server accesses content in the second CDN content storage by using an IP layer storage access protocol.

7. An edge node on a content delivery network (CDN), comprising:
a first CDN media server; and
a first CDN content storage, wherein the first CDN media server generates a first content index corresponding to a logical storage unit in the first CDN content storage by mounting a logical storage unit in the first CDN content storage;
wherein the edge node interconnects with a backbone node on the CDN,
wherein the backbone node is formed of a second CDN media server and a second CDN content storage, and
wherein the first CDN media server accesses content in the second CDN content storage by using an IP (Internet Protocol) layer storage access protocol.

8. The edge node according to claim 7, wherein if the first CDN content storage and the second CDN content storage have same content and if the same content needs to be accessed, then the first CDN media server preferably accesses the first CDN content storage.

9. The edge node according to claim 7, wherein the first CDN media server generates a second content index corresponding to the logical storage unit in the second CDN content storage by using an IP layer storage access protocol and mounting the logical storage unit in the second CDN content storage.

10. The edge node according to claim 9, wherein:
when receiving, from a user, a request for accessing content, the first CDN media server searches the first content index and the second content index to obtain the CDN content storage where requested access content is located;
when the requested access content is stored in the first CDN content storage, the first CDN media server obtains the requested access content from the first CDN content storage; and
when the requested access content is stored in the second CDN content storage, the first CDN media server accesses the second CDN content storage by using the IP layer storage access protocol to obtain the requested access content.

11. The edge node according to claim 7 wherein the IP layer storage access protocol is an Internet Small Computer System Interface (iSCSI) protocol.

12. A content delivery network, comprising:
an edge node;
a backbone node;
a centre node, wherein the edge node, the backbone node, and the centre node are configured to store content with different popularity of access from users, respectively; and a delivery node, wherein content storages are deployed on the edge node, the backbone node, and the centre node, wherein a media server is deployed on the delivery node; and wherein the media server accesses the content storages on the edge node, the backbone node, and the centre node by using an IP (Internet Protocol) layer storage access protocol, wherein priorities for accessing the content storages on the edge node, the backbone node, and the centre node are set in the media server, and the media server searches for content according to the priorities and provides the content for a user.

* * * * *